(12) United States Patent
Frait et al.

(10) Patent No.: US 12,044,307 B2
(45) Date of Patent: Jul. 23, 2024

(54) UNITIZED VALVE BODY HAVING CONNECTION ORIFICES

(71) Applicant: Ford Global Technologies, LLC, Dearborn, MI (US)

(72) Inventors: Steven Anatole Frait, Milan, MI (US); Frank Hanson, Westland, MI (US)

(73) Assignee: Ford Global Technologies, LLC, Dearborn, MI (US)

( * ) Notice: Subject to any disclaimer, the term of this patent is extended or adjusted under 35 U.S.C. 154(b) by 211 days.

(21) Appl. No.: 17/552,025

(22) Filed: Dec. 15, 2021

(65) Prior Publication Data

US 2023/0184323 A1 Jun. 15, 2023

(51) Int. Cl.
| | | |
|---|---|---|
| *F16H 61/00* | (2006.01) | |
| *B22F 3/105* | (2006.01) | |
| *B22F 5/10* | (2006.01) | |
| *F15B 13/08* | (2006.01) | |
| *F16H 61/02* | (2006.01) | |
| *F16L 41/03* | (2006.01) | |
| *F16L 41/16* | (2006.01) | |

(52) U.S. Cl.
CPC ......... *F16H 61/0009* (2013.01); *B22F 3/105* (2013.01); *B22F 5/106* (2013.01); *F15B 13/0814* (2013.01); *F15B 13/085* (2013.01); *F16H 61/0206* (2013.01); *F16H 61/0251* (2013.01); *F16L 41/03* (2013.01); *F16L 41/16* (2013.01)

(58) Field of Classification Search
CPC . F16H 61/0009; F15B 13/0814; F16K 27/003
See application file for complete search history.

(56) References Cited

U.S. PATENT DOCUMENTS

| | | | |
|---|---|---|---|
| 6,340,034 B1 * | 1/2002 | Arnott | F16K 27/003 137/550 |
| 9,771,890 B2 | 9/2017 | Hwang | |
| 9,850,920 B2 * | 12/2017 | Inada | F15B 13/0814 |
| 10,302,191 B2 | 5/2019 | Uesugi et al. | |
| 10,428,933 B2 | 10/2019 | Mills | |
| 10,590,962 B2 | 3/2020 | Coolidge et al. | |
| 10,858,806 B2 | 12/2020 | Ferraz, Jr. et al. | |
| 11,644,116 B1 * | 5/2023 | Frait | F16K 27/003 137/594 |
| 2019/0390664 A1 | 12/2019 | Babbini et al. | |
| 2020/0130101 A1 | 4/2020 | Jones et al. | |
| 2020/0201365 A1 * | 6/2020 | Shimizu | F15B 13/0825 |
| 2022/0213972 A1 * | 7/2022 | Watanabe | F16K 1/46 |

FOREIGN PATENT DOCUMENTS

| | | | |
|---|---|---|---|
| CN | 111779724 | 10/2020 | |
| CN | 111931398 | 11/2020 | |
| EP | 3637110 | 4/2020 | |
| WO | WO-2020217665 A1 * | 10/2020 | F16K 1/46 |

\* cited by examiner

*Primary Examiner* — Michael R Reid

(74) *Attorney, Agent, or Firm* — Burris Law, PLLC

(57) ABSTRACT

A unitized valve body for use in an automatic transmission includes a plurality of first hydraulic passages, a second hydraulic passage and a plurality of orifices. The second hydraulic passage extending through the unitized valve body and configured to be in fluid communication with a plurality of valve bores. Each orifice disposed within the unitized valve body and fluidly connecting the second hydraulic passage to a respective first hydraulic passage of the plurality of first hydraulic passages.

20 Claims, 8 Drawing Sheets

UNITIZED VALVE BODY HAVING CONNECTION ORIFICES

FIELD

The present disclosure relates to a valve body having connection orifices and a vehicle including a valve body having connection orifices.

BACKGROUND

The statements in this section merely provide background information related to the present disclosure and may not constitute prior art.

Transmission valve bodies typically consist of aluminum castings with worm trail routing of multiple connections between various working elements. These worm trail fluid paths typically must be two-dimensional, and cannot cross over the path of another trail. Due to this two-dimensional limitation of typical transmission valve bodies, providing a flow path from one element to another can often require a lengthy and convoluted path that adds to the complexity, cost, and size of the casting.

One method of overcoming this two-dimensional limitation includes manufacturing multiple valve bodies, each having its own two-dimensional worm trails, and connecting the valve bodies with one or more separator plates configured to permit fluid communication between the worm trails of the valve bodies in a third dimension at predetermined locations. Such separator plates require gasket seals and precise machining of the gasket surfaces. These separator plates also only allow binary cross-over of the hydraulic circuitry from one two-dimensional worm trail casting to another two-dimensional worm trail casting. Furthermore, the use of separator plates typically requires the use of additional fasteners to connect the assembly together, which can increase cost and assembly time. Additionally, the two-dimensional worm trails of each valve body must be routed around these fasteners, adding further size and complexity.

These sizing and complexity issues related to transmission valve bodies, among other issues related transmission valve bodies, are addressed by the present disclosure.

SUMMARY

This section provides a general summary of the disclosure and is not a comprehensive disclosure of its full scope or all of its features.

In one form, the present disclosure provides a unitized valve body for use in an automatic transmission. The unitized valve body comprises a plurality of first hydraulic passages extending through the unitized valve body, a second hydraulic passage, and a plurality of first orifices. The second hydraulic passage extends through the unitized valve body and is configured to be in fluid communication with a plurality of valve bores. The plurality of first orifices are disposed within the unitized valve body. Each first orifice fluidly connects the second hydraulic passage to a respective first hydraulic passage of the plurality of first hydraulic passages.

In variations of the unitized valve body of the above paragraph, which may be implemented individually or in any combination: the second hydraulic passage has a first diameter and the first orifices have a second diameter, the second diameter is less than 33% of the first diameter; fluid flowing in the respective first hydraulic passage has a first pressure and fluid flowing in the second hydraulic passage has a second pressure, the second pressure being different than the first pressure; each first hydraulic passage is configured to be fluidly connected to one of a respective clutch, a torque converter, a lubrication circuit, and a cooling circuit; the second hydraulic passage is substantially linear; the valve body does not include mechanical fasteners; the valve body is formed by additive manufacturing; the first orifices extend normal to the first and second hydraulic passages; the first orifices have a circular cross-section; and a third hydraulic passage extends through the unitized valve body and extends parallel to the second hydraulic passage and a plurality of second orifices disposed within the unitized valve body, each second orifice fluidly connecting the third hydraulic passage to a respective valve bore of the plurality of valve bores.

In another form, the present disclosure provides a unitized valve body for use in an automatic transmission. The unitized valve body comprises a plurality of first hydraulic passages extending through the unitized valve body, a second hydraulic passage, and a plurality of first orifices. The second hydraulic passage extends through the unitized valve body and is configured to be in fluid communication with a plurality of valve bores. The plurality of first orifices are disposed within the unitized valve body. Each first orifice fluidly connects the second hydraulic passage to a respective first hydraulic passage of the plurality of first hydraulic passages. The orifices extend normal to the first and second hydraulic passages.

In yet another form, a unitized valve body is manufactured by an additive manufacturing process.

Further areas of applicability will become apparent from the description provided herein. It should be understood that the description and specific examples are intended for purposes of illustration only and are not intended to limit the scope of the present disclosure.

DRAWINGS

In order that the disclosure may be well understood, there will now be described various forms thereof, given by way of example, reference being made to the accompanying drawings, in which.

Figure 1:
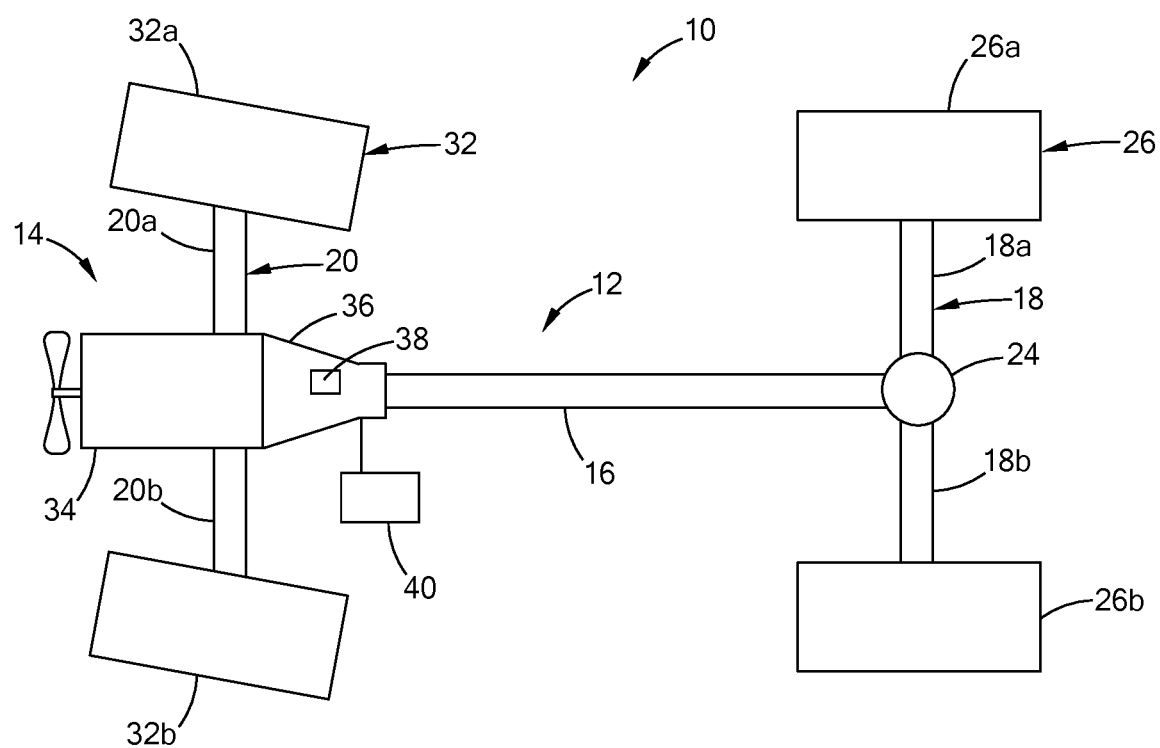
FIG. 1 is a schematic view of a vehicle including a transmission having a valve body assembly according to the principles of the present disclosure.
Figure 2:
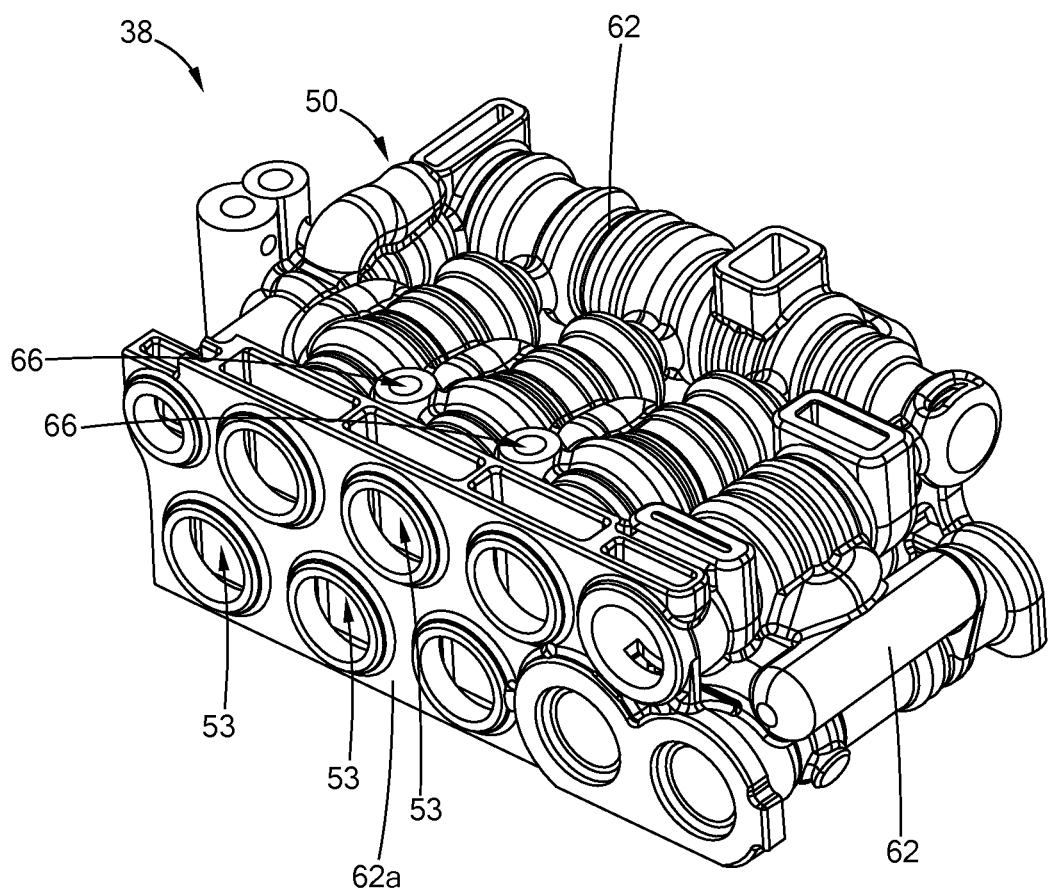
FIG. 2 is a perspective view of a valve body of the valve body assembly of FIG. 1.
Figure 3:
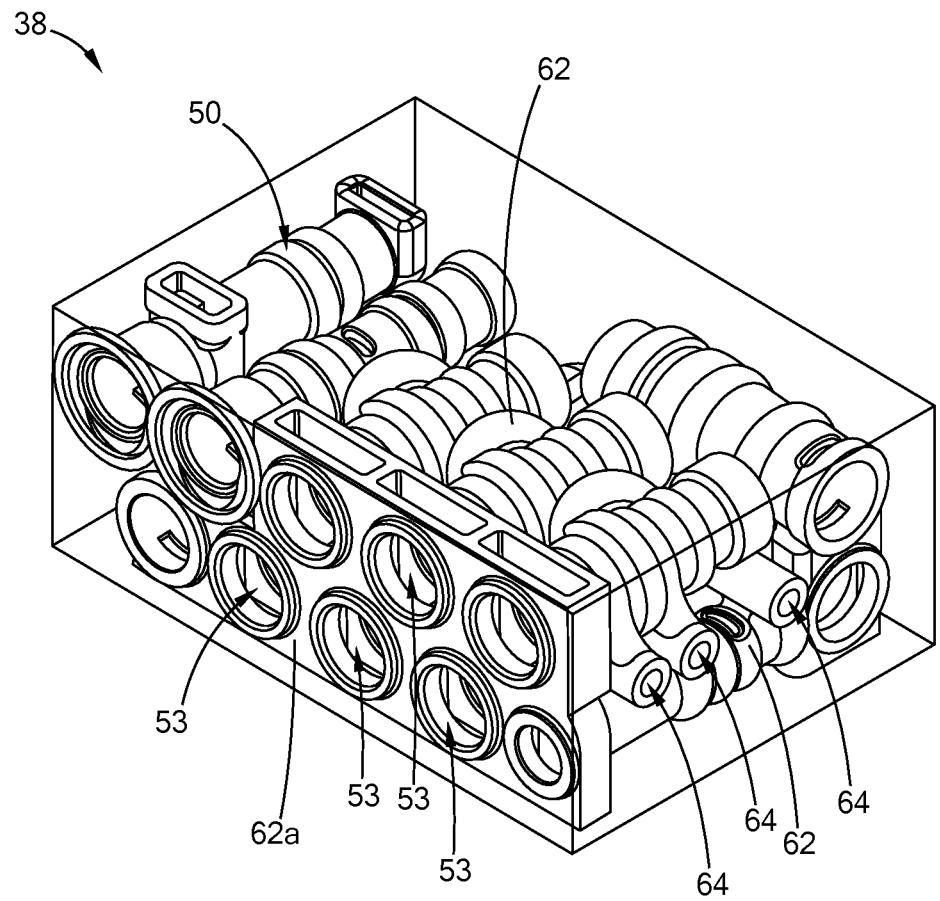
FIG. 3 is another perspective view of the valve body of the valve body assembly of FIG. 1.
Figure 4:
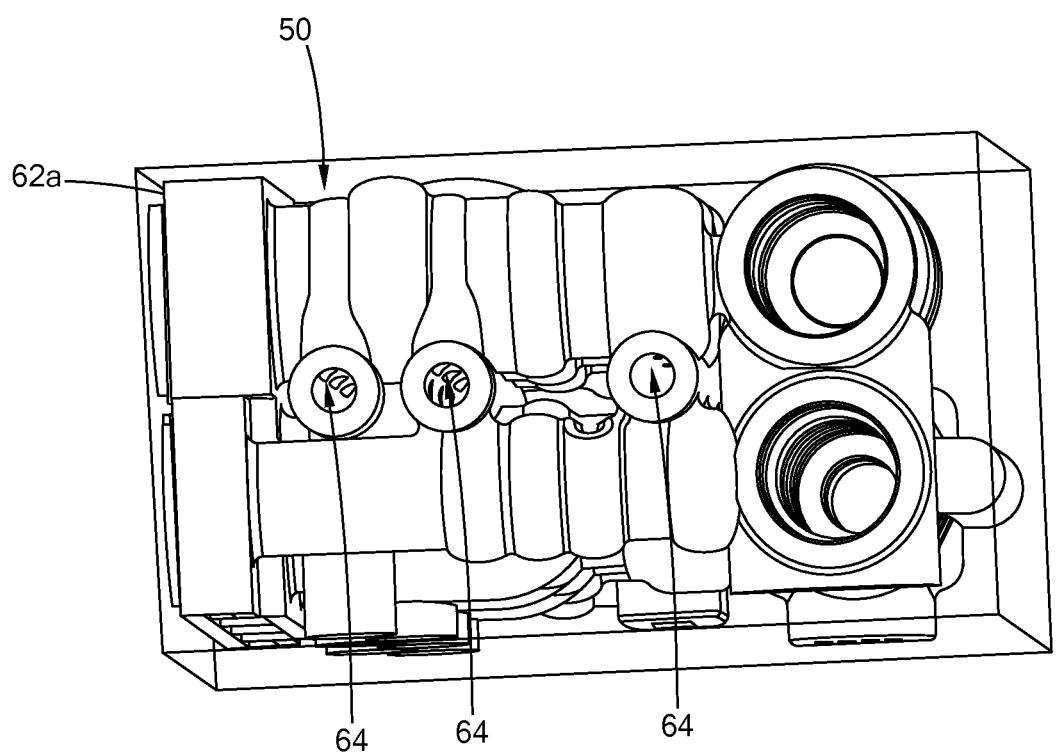
FIG. 4 is a side view of the valve body of the valve body assembly of FIG. 1.

The drawings described herein are for illustration purposes only and are not intended to limit the scope of the present disclosure in any way.

DETAILED DESCRIPTION

The following description is merely exemplary in nature and is not intended to limit the present disclosure, application, or uses. It should be understood that throughout the drawings, corresponding reference numerals indicate like or corresponding parts and features.

With reference to FIG. 1, a vehicle 10 is provided that includes a drivetrain system 12 and a powertrain system 14. In the particular configuration shown in FIG. 1, the drivetrain system 12 includes, inter alia, a propeller shaft 16, a primary axle 18, a secondary axle 20, and a rear differential 24. Rotary power (vehicle torque) generated by the powertrain system 14 is transmitted to the drivetrain system 12. That is, rotary power generated by the powertrain system 14 is transmitted to the primary axle 18 via the propeller shaft 16 to drive a set of rear wheels 26. The primary axle 18 includes a first shaft 18a and a second shaft 18b. The first shaft 18a drives a first wheel 26a of the set of rear wheels 26 and the second shaft 18b drives a second wheel 26b of the set of rear wheels 26. The secondary axle 20 includes a first shaft 20a and a second shaft 20b. The first shaft 20a is connected to a first wheel 32a of a set of front wheels 32 and the second shaft 20b is connected to a second wheel 32b of the set of front wheels 32. The powertrain system 14 includes an engine 34 and a transmission 36 such as an automatic transmission, for example. The engine 34 generates rotary power and may be an internal combustion engine, for example.

The transmission 36 transmits rotary power from the engine 34 to the drivetrain system 12. The transmission 36 is generally controlled using hydraulic fluid. That is, the transmission 36 is cooled, lubricated, actuated, and modulates torque, for example, using hydraulic fluid. To these ends, the transmission 36 is in electrical communication with an electronic controller 40 used to direct, control, or otherwise regulate flow of fluid throughout the transmission 36. In order to facilitate the flow of hydraulic fluid throughout the transmission 36, the vehicle 10 includes at least one or more pumps to supply pressurized fluid to the transmission 36. It should be appreciated that the pumps provide high flow high pressure hydraulic fluid to the transmission 36.

The transmission 36 includes, inter alia, a casing (not shown) and a valve body assembly 38. With reference to FIGS. 2-8, the valve body assembly 38 is secured to the casing and includes a plurality of solenoid actuators 48 (FIG. 8) and a valve body 50. Each solenoid actuator 48 includes a spool valve (i.e., hydraulic control valve). The spool valve is slidably disposed within a corresponding valve bore 53 of the valve body 50 and is configured to be axially positioned by an armature (not shown) of the solenoid actuator 48 depending on an activation state of the solenoid actuator 48. The spool valve includes a plurality of cylindrical sealing segments (not shown) axially spaced apart from each other and having an outer diameter greater than adjacent lengths of the spool valve. A cylindrical surface (not shown) of the sealing segments is allowed to engage an inner cylindrical surface of the valve bore 53, while fluid communication is permitted in the areas between adjacent ones of the sealing segments. The solenoid actuators 48 can be on/off actuators, variable pressure actuators, or variable flow actuators and can receive electrical power from an electrical source and can receive control signals from a control module.

The valve body 50 is in the form of a single unitized, monolithic body that can be manufactured by an additive manufacturing process. In this way, the valve body 50 does not include fasteners such as bolts, for example, securing two or more shells or housings to each other and/or to one or more separator plates. The manufacturing process can include laser sintering, for example, that can generally include a laser, a means for applying subsequent layers of powdered sintering material (e.g., metal powder), and a controller that controls operation of the laser and the amount and timing of the deposition of the metal powder. It should be understood that other 3D printing/additive manufacturing methods may be employed to achieve the unitized, monolithic body, along with a variety of different materials, while remaining within the scope of the present disclosure.

Figure 5:
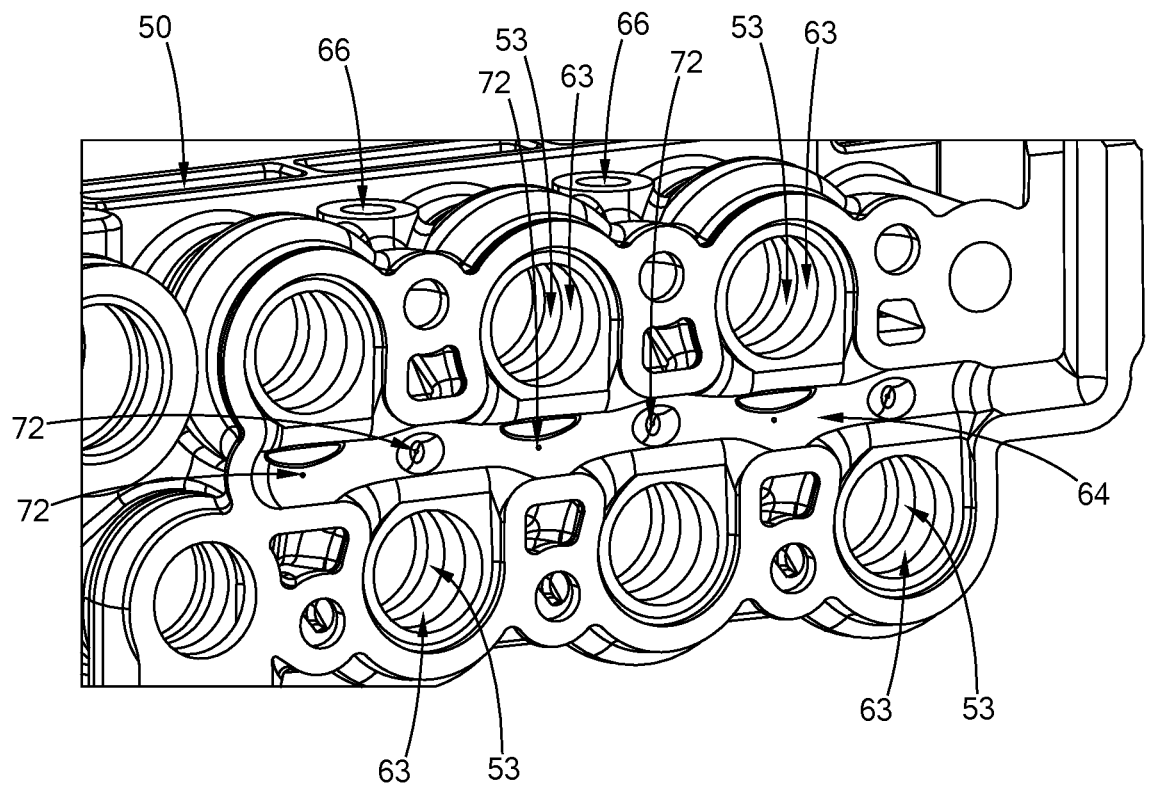
FIG. 5 is a cross-sectional perspective view of the valve body of the valve body assembly of FIG. 1.
Figure 6:
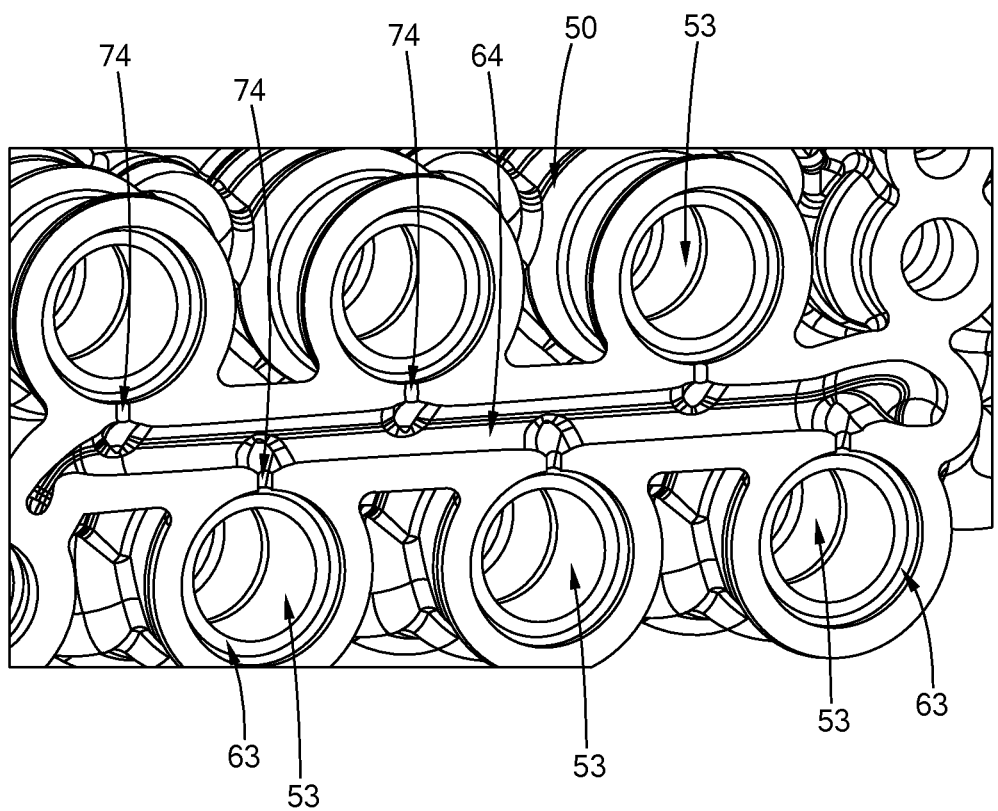
FIG. 6 is another cross-sectional perspective view of the valve body of the valve body assembly of FIG. 1.
Figure 7:
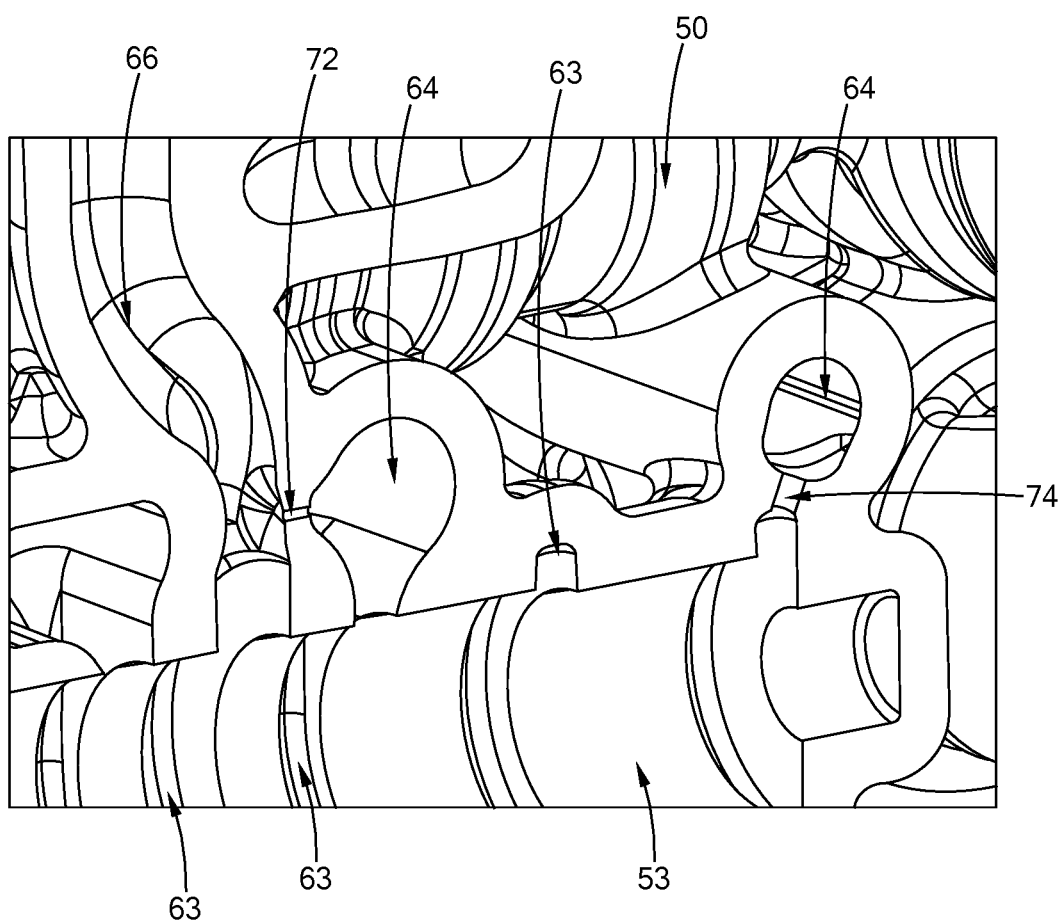
FIG. 7 is yet another cross-sectional perspective view of a portion of the valve body of the valve body assembly of FIG. 1.
Figure 8:
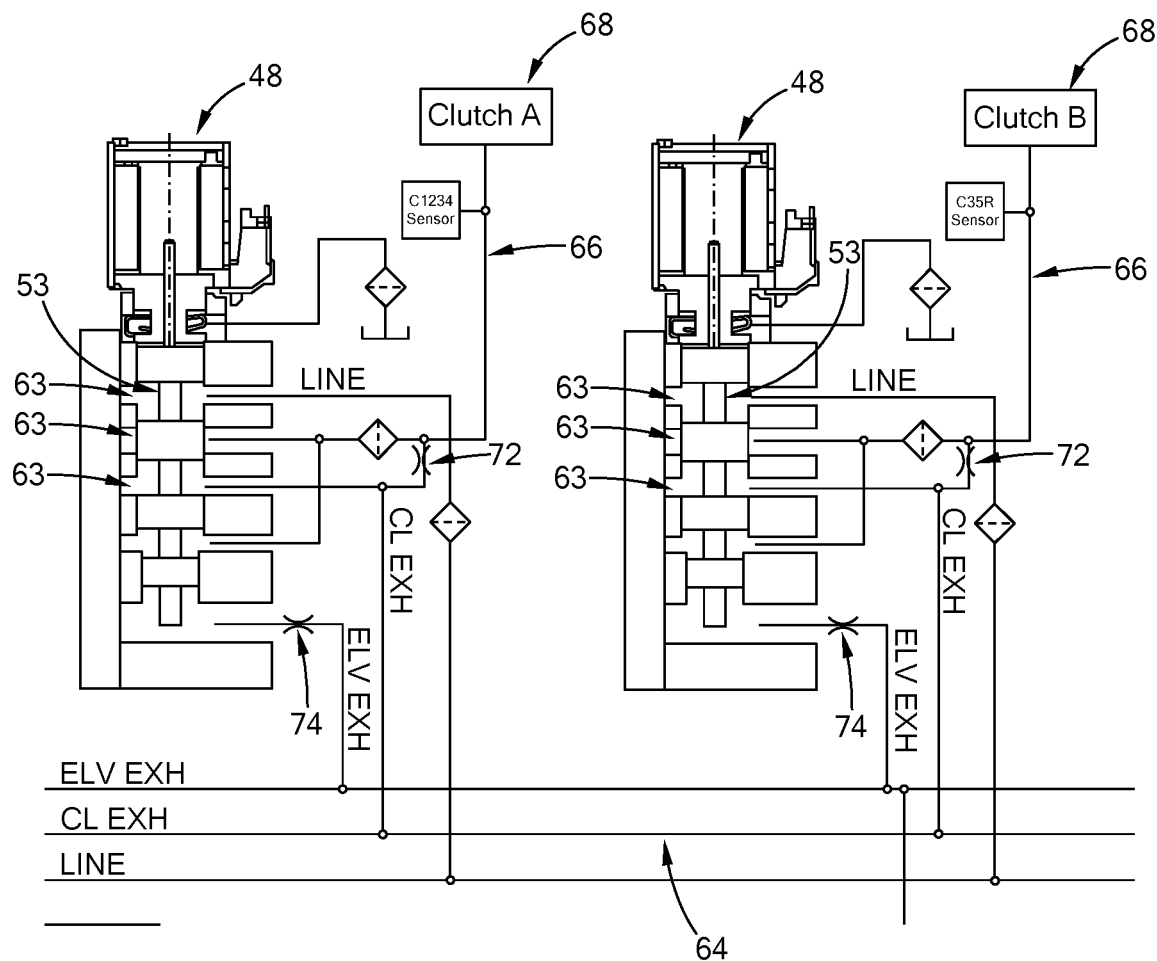
FIG. 8 is a schematic view of a portion of a hydraulic circuit of the transmission of FIG. 1.

The valve body 50 includes a plurality of sides 62. In the example illustrated, side 62a of the valve body 50 defines the plurality of valve bores 53 formed therein. The valve body 50 also comprises a plurality of annuluses or rings 63, a plurality of connecting hydraulic passages 66, a plurality of trunk hydraulic passages 64, and a plurality of orifices 72, 74. With reference to FIGS. 5-7, the plurality of annuluses 63 are axially spaced apart from each other along a corresponding valve bore 53. The annuluses 63 are also in fluid communication with the corresponding valve bore 53. Each annulus 63 is also in fluid communication with a corresponding passage 64, 66 via an inlet/outlet port. One example of such annulus 63 is disclosed in Applicant's co-pending U.S. patent application Ser. No. 17/552,039, filed on Dec. 15, 2021, and titled "UNITIZED VALVE BODY HAVING ANNULUS" which is commonly owned with the present application and the contents of which are incorporated herein by reference in its entirety.

The plurality of connecting hydraulic passages 66 are in fluid communication with different devices through the transmission 36. For example, the connecting hydraulic passages 66 can be coupled to a corresponding one of a return line of a pump (not shown), an outlet of a cooling fluid circuit (not shown), a supply line of the pump (not shown), a clutch lubrication circuit (not shown), or a filtered fluid inlet (not shown), though other devices can be used. The plurality of connecting hydraulic passages 66 are also in fluid communication with respective valve bores 53. In the example illustrated in FIG. 8, the connecting hydraulic passage 66 fluidly connects a respective valve bore 53 to a respective clutch 68. In this way, hydraulic fluid flows from the respective valve bore 53 to the respective clutch 68, and may control the position of the respective clutch 68.

With reference to FIGS. 3-7, the trunk hydraulic passages 64 may be connected to a pressurized fluid source such as a pump located external to the valve body 50. The trunk hydraulic passages 64 are also in fluid communication with the valve bores 53 and are arranged parallel to each other. The valve bores 53 extend normal to the trunk hydraulic passages 64 and are arranged above and below the trunk hydraulic passages 64 in a staggered arrangement. In the example illustrated, each trunk hydraulic passage 64 is substantially linear and has a generally circular cross-section. In some forms, the trunk hydraulic passages 64 may have a semi-circular or other suitable cross-section, for example, allowing hydraulic fluid to easily flow through. One or more of the trunk hydraulic passages 64 extend substantially a length of the valve body 50. One example of such trunk hydraulic passage 64 is disclosed in Applicant's U.S. patent application Ser. No. 17/552,032, filed on Dec. 15, 2021, now U.S. Pat. No. 11,644,116 and titled "UNITIZED VALVE BODY HAVING FLOW PASSAGES" which is commonly owned with the present application and the contents of which are incorporated herein by reference in its entirety.

With reference to FIGS. 5 and 7, the orifices 72 fluidly connect one trunk hydraulic passage 64 and respective connecting hydraulic passages 66 such that a portion of the hydraulic fluid flowing through the trunk hydraulic passage 64 flows to the respective connecting hydraulic passages 66.

The hydraulic fluid flowing in the trunk hydraulic passage 64 has a fluid pressure that is different from hydraulic fluid flowing in the connecting hydraulic passages 66. For example, the pressure of hydraulic fluid flowing in the trunk hydraulic passage 64 may be greater than the pressure of hydraulic fluid flowing in the connecting hydraulic passages 66. In another example, the pressure of hydraulic fluid flowing in the connecting hydraulic passages 66 may be greater than the pressure of hydraulic fluid flowing in the trunk hydraulic passage 64.

In the example illustrated, the orifices 72 extend normal to the trunk hydraulic passage 64 and the connecting hydraulic passages 66. In another form, the orifices 72 may extend oblique to the trunk hydraulic passage 64 and the connecting hydraulic passages 66. In the example illustrated, the orifices 72 have a circular cross-section and include a diameter that is smaller than a diameter of the trunk hydraulic passages 64. For example, the diameter of the orifices 72 may be less than 33% of the diameter of the trunk hydraulic passages 64. In one example, the diameter of the orifices 72 may be 0.5 millimeters (mm) and the diameter of the hydraulic passages 64 may be six (6) millimeters (mm). The axial length of the orifices 72 depend at least in part on the thickness of the walls of the valve body 50, which can be at least two (2) millimeters (mm). In some forms, the cross-sectional shape of the orifices 72 may be semi-circular, for example, or any other suitable shape that facilitates fluid flow therethrough.

With reference to FIGS. 5 and 6, the orifices 74 fluidly connect one trunk hydraulic passage 64 and respective valve bores 53 such that a portion of the hydraulic fluid flowing through the trunk hydraulic passage 64 flows to the respective valve bores 53. In this way, hydraulic fluid flowing from the trunk hydraulic passage 64 to the respective valve bores 53 facilitates stabilization of the spool valve (not shown) slidably disposed within the valve bores 53. The orifices 74 extend oblique to the trunk hydraulic passage 64 and the orifices 72. In another form, the orifices 74 may extend normal to the trunk hydraulic passage 64 and the connecting hydraulic passages 66. In the example illustrated, the orifices 74 have a circular cross-section and include a diameter that is greater than the diameter of the orifices 72 and smaller than the diameter of the hydraulic passages 64. In some forms, the cross-sectional shape of the orifices 74 may be semi-circular, for example, or any other suitable shape that facilitates fluid flow therethrough.

The valve body 50 of the present disclosure being additively manufactured provides the benefit of allowing orifices 72 to connect one trunk hydraulic passage 64 and respective connecting hydraulic passages 66 to each other, and allowing orifices 74 to connect one trunk hydraulic passage 64 and respective valve bores 53 to each other. In this way, the sizing (e.g., length, diameter, etc.) of the orifices 72, 74 are improved, which reduces the overall footprint of the valve body 50. The valve body 50 of the present disclosure being additively manufactured also provides the benefit of reduced passage lengths allowed by connecting passages in multiple dimensions.

Unless otherwise expressly indicated herein, all numerical values indicating mechanical/thermal properties, compositional percentages, dimensions and/or tolerances, or other characteristics are to be understood as modified by the word "about" or "approximately" in describing the scope of the present disclosure. This modification is desired for various reasons including industrial practice, material, manufacturing, and assembly tolerances, and testing capability.

As used herein, the phrase at least one of A, B, and C should be construed to mean a logical (A OR B OR C), using a non-exclusive logical OR, and should not be construed to mean "at least one of A, at least one of B, and at least one of C."

In this application, the term "controller" and/or "module" may refer to, be part of, or include: an Application Specific Integrated Circuit (ASIC); a digital, analog, or mixed analog/digital discrete circuit; a digital, analog, or mixed analog/digital integrated circuit; a combinational logic circuit; a field programmable gate array (FPGA); a processor circuit (shared, dedicated, or group) that executes code; a memory circuit (shared, dedicated, or group) that stores code executed by the processor circuit; other suitable hardware components (e.g., op amp circuit integrator as part of the heat flux data module) that provide the described functionality; or a combination of some or all of the above, such as in a system-on-chip.

The term memory is a subset of the term computer-readable medium. The term computer-readable medium, as used herein, does not encompass transitory electrical or electromagnetic signals propagating through a medium (such as on a carrier wave); the term computer-readable medium may therefore be considered tangible and non-transitory. Non-limiting examples of a non-transitory, tangible computer-readable medium are nonvolatile memory circuits (such as a flash memory circuit, an erasable programmable read-only memory circuit, or a mask read-only circuit), volatile memory circuits (such as a static random access memory circuit or a dynamic random access memory circuit), magnetic storage media (such as an analog or digital magnetic tape or a hard disk drive), and optical storage media (such as a CD, a DVD, or a Blu-ray Disc).

The apparatuses and methods described in this application may be partially or fully implemented by a special purpose computer created by configuring a general-purpose computer to execute one or more particular functions embodied in computer programs. The functional blocks, flowchart components, and other elements described above serve as software specifications, which can be translated into the computer programs by the routine work of a skilled technician or programmer.

The description of the disclosure is merely exemplary in nature and, thus, variations that do not depart from the substance of the disclosure are intended to be within the scope of the disclosure. Such variations are not to be regarded as a departure from the spirit and scope of the disclosure.

What is claimed is:

1. A unitized valve body for use in an automatic transmission, the unitized valve body comprising:
a plurality of first hydraulic passages extending through the unitized valve body;
a second hydraulic passage extending through the unitized valve body and configured to be in fluid communication with a plurality of valve bores; and
a plurality of first orifices disposed within the valve body, each first orifice fluidly connecting the second hydraulic passage to a respective first hydraulic passage of the plurality of first hydraulic passages,
wherein each first orifice extends through a wall of the unitized valve body that separates the first hydraulic passages and the second hydraulic passage.

2. The unitized valve body of claim 1, wherein the second hydraulic passage has a first diameter and the first orifices have a second diameter, and wherein the second diameter is less than 33% of the first diameter.

3. The unitized valve body of claim 1, wherein fluid flowing in the respective first hydraulic passage has a first pressure and fluid flowing in the second hydraulic passage has a second pressure, the second pressure being different than the first pressure.

4. The unitized valve body of claim 1, wherein each first hydraulic passage is configured to be fluidly connected to one of a respective clutch, a torque converter, a lubrication circuit, and a cooling circuit.

5. The unitized valve body of claim 1, wherein the second hydraulic passage is substantially linear.

6. The unitized valve body of claim 1, wherein the valve body does not include mechanical fasteners.

7. The unitized valve body of claim 1, wherein the valve body is formed by additive manufacturing.

8. The unitized valve body of claim 1, wherein the first orifices extend normal to the first and second hydraulic passages.

9. The unitized valve body of claim 1, wherein the first orifices have a circular cross-section.

10. The unitized valve body of claim 1 further comprising:
   a third hydraulic passage extending through the unitized valve body and extending parallel to the second hydraulic passage; and
   a plurality of second orifices disposed within the unitized valve body, each second orifice fluidly connecting the third hydraulic passage to a respective valve bore of the plurality of valve bores.

11. A unitized valve body for use in an automatic transmission, the unitized valve body comprising:
   a plurality of first hydraulic passages extending through the unitized valve body;
   a second hydraulic passage extending through the unitized valve body and configured to be in fluid communication with a plurality of valve bores; and
   a plurality of orifices disposed within the unitized valve body, each orifice fluidly connecting the second hydraulic passage to a respective first hydraulic passage of the plurality of first hydraulic passages,
   wherein the orifices extend normal to the first and second hydraulic passages.

12. The unitized valve body of claim 11, wherein the second hydraulic passage has a first diameter and the orifices have a second diameter, and wherein the second diameter is less than 33% of the first diameter.

13. The unitized valve body of claim 11, wherein fluid flowing in the respective first hydraulic passage has a first pressure and fluid flowing in the second hydraulic passage has a second pressure, the second pressure being different than the first pressure.

14. The unitized valve body of claim 11, wherein each first hydraulic passage is configured to be fluidly connected to one of a respective clutch, a torque converter, a lubrication circuit, and a cooling circuit.

15. The unitized valve body of claim 11, wherein the second hydraulic passage is substantially linear.

16. The unitized valve body of claim 11, wherein the orifices have a circular cross-section.

17. The unitized valve body of claim 11, wherein the valve body does not include mechanical fasteners.

18. A unitized valve body manufactured by an additive manufacturing process, the unitized valve body comprising:
   a plurality of first hydraulic passages extending through the unitized valve body,
   a second hydraulic passage extending through the unitized valve body and configured to be in fluid communication with a plurality of valve bores; and
   a plurality of orifices disposed within the unitized valve body, each orifice fluidly connecting the second hydraulic passage to a respective first hydraulic passage of the plurality of first hydraulic passages,
   wherein each orifice extends through a wall of the unitized valve body that separates the first hydraulic passages and the second hydraulic passage.

19. The unitized valve body of claim 18, wherein the orifices extend normal to the first and second hydraulic passages.

20. The unitized valve body of claim 18, wherein the second hydraulic passage has a first diameter and the orifices have a second diameter, and wherein the second diameter is less than 33% of the first diameter.

* * * * *